US008103952B2

(12) United States Patent
Hopp

(10) Patent No.: US 8,103,952 B2
(45) Date of Patent: Jan. 24, 2012

(54) DIRECTED SAX PARSER FOR XML DOCUMENTS

(75) Inventor: Darrell Vaughn Hopp, Mission Viejo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1079 days.

(21) Appl. No.: 11/692,146

(22) Filed: Mar. 27, 2007

(65) Prior Publication Data

US 2008/0244586 A1 Oct. 2, 2008

(51) Int. Cl.
*G06F 17/22* (2006.01)
(52) U.S. Cl. ........................................ 715/234
(58) Field of Classification Search ........... 715/234–242
See application file for complete search history.

(56) References Cited

U.S. PATENT DOCUMENTS

| | | | | |
|---|---|---|---|---|
| 7,730,467 | B1* | 6/2010 | Hejlsberg et al. | 717/143 |
| 2002/0062311 | A1* | 5/2002 | Kircher | 707/3 |
| 2002/0112224 | A1* | 8/2002 | Cox | 717/100 |
| 2003/0005001 | A1* | 1/2003 | Kataoka | 707/513 |
| 2004/0117381 | A1* | 6/2004 | Yankovsky | 707/100 |
| 2004/0205082 | A1* | 10/2004 | Fontoura et al. | 707/101 |
| 2005/0097128 | A1* | 5/2005 | Ryan et al. | 707/103 Y |
| 2006/0112090 | A1* | 5/2006 | Amer-Yahia et al. | 707/4 |
| 2007/0113172 | A1* | 5/2007 | Behrens et al. | 715/513 |
| 2008/0033974 | A1* | 2/2008 | Cameron | 707/101 |

OTHER PUBLICATIONS

Lu et al., A Parallel Approach to XML Parsing, pp. 223-230 (IEEE, Proceedings of the 7th IEEE/ACM International Conference on Grid Computing, 2006).*
Marlan et al., Adaptive Processing of Top-K Queries in XML, p. 1-12 (IEEE, Lu et al., Proceedings of the 21st International Confierence on Data Engineering, 2005).*
Lu et al., Parallel Processing XML Documents, p. 1-10 (IEEE, Proceedings of the International Database Engineering and Applications Symposium, 2002).*
Josflovski et al., Querying XML Streams, p. 197-210 (Springer-Verlag, The VLDB Journal vol. 14, 2005).*

* cited by examiner

*Primary Examiner* — Laurie Ries
*Assistant Examiner* — Frank D Mills
(74) *Attorney, Agent, or Firm* — Chen Yoshimura LLP

(57) ABSTRACT

A method for processing XML documents using a SAX parser, implemented in a two-thread architecture having a main thread and a parsing thread. The parsing procedure is located in a parsing thread, which implements callback functions of a SAX parser and creates and executes the SAX parser. The main thread controls the parsing thread by sending target content to be searched for and wakeup signals to the parsing thread, and receives the content found by the parsing thread for further processing. In the parsing thread, each time a callback function is invoked by the SAX parser, it is determined whether the target content has been found. If it has, the parsing thread sends the found content to the main thread with a wakeup signal, and enters a sleep mode, whereby further parsing is halted until a wakeup signal with additional target content is received from the main thread.

12 Claims, 2 Drawing Sheets

DIRECTED SAX PARSER FOR XML DOCUMENTS

BACKGROUND OF THE INVENTION

1. Field of the Invention

This invention relates to XML processing, and in particular, it relates to a method and related apparatus for parsing XML files.

2. Description of Related Art

XML (Extensible Markup Language) is general-purpose markup language widely used to facilitate the sharing of data across different information systems, particularly systems connected via a network such as the Internet. There are a number of well-known XML processing software libraries available to software developers. The two most widely used algorithms for parsing XML files are DOM (Document Object Model) and SAX (Simple API for XML). In a DOM-style parse, the parser module breaks an XML document into a tree data structure. Each node of the tree corresponds to a structure element of the XML file. For extremely large XML files, a DOM parse is a problem due to the large amount of memory required to store the document tree data structure. A DOM style parse of such a large file could result in the application attempting to allocate physical memory and result in an out-of-memory condition. For such large files, a SAX-style parse would be preferred. A SAX parse is event-driven and takes a piecemeal approach to processing an XML document. In a SAX parse, an application (such as an XML to PostScript® (PS) converter program or other programs that utilize XML files) implements a set of pre-defined callback functions that are invoked by a SAX parser, which is a separate module. When an instance of the SAX parser is created, a pointer to the callback functions is passed to the parser. The SAX parser then reads through the XML document from start to finish and invokes callback functions for XML structural elements that it encounters.

SUMMARY

The inventors of this invention have identified certain issues with SAX parsers when dealing with large XML files. As described earlier, a SAX parser reads an input XML file and invokes callback functions when it encounters certain structural elements in the XML file. Once started, a SAX parser runs to completion, processing an entire XML document without pause. The first problem with this approach is that the application that invokes the SAX parser often does not know which content it will search for in the XML document at the time the parse is started. If additional content needs to be searched for, a new XML parse would be necessary to locate the content. A second problem with the XML parsing arises when the application is directed to search for multiple structure elements in the XML file. If the XML file is very large, it would be very time-consuming to search for content that is located towards the end of the file.

Accordingly, the present invention is directed to a method for parsing an XML file that substantially obviates one or more of the problems due to limitations and disadvantages of the related art.

An object of the present invention is to provide an XML parsing mechanism that optimizes the parsing and searching of very large XML files under certain conditions.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing an Extensible Markup Language (XML) document, which includes: in a main thread, (a) creating a parsing thread; (b) sending an ID of next target content to be searched for in the XML document to the parsing thread, and sending a first wakeup signal to the parsing thread; in the parsing thread, (c) after receiving the first wakeup signal from the main thread, obtaining the ID of next target content send by the main thread; (d) executing an event-driven XML parsing program to parse a portion of the XML document, the XML parsing program invoking one or more callback functions when encountering one or more pre-defined events in the XML document; and (e) in response to a callback function invoked by the XML parsing program, sending target content found by the XML parsing program to the main thread, sending a second wakeup signal to the main thread, and then entering a sleep mode.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

The invention described in this document overcomes the problems associated with a normal SAX-style parser outline above. Embodiments of this invention provide a SAX parsing method in which the SAX parser can be paused at desired points in the parsing process. While the parser is in the paused state, it can be configured by a wakeup signal to search for additional content. An advantage of this approach is that the parser does not need to finish the entire XML file after the target content has been found, and does not need to be restarted each time additional content is searched for.

The SAX parsing method uses a two-thread architecture having two threads of execution. The actual parsing procedure is located in a parsing thread, which is a separate thread from a main thread. The parsing thread implements the callback functions of a SAX parser and creates and executes the SAX parser. The main thread controls the parsing thread and further processes (e.g. converts to PostScript, saves to disk, etc.) content located by the parsing thread.

When created, the parsing thread in turn creates and initializes an instance of a SAX parser. In each callback function implemented in the parsing thread, a check is made to see whether the target content has been located. If not, the SAX parser continues processing the document XML. If the target content has been located, the parsing thread returns status to the main thread and then waits for further direction from the main thread.

The main thread creates an instance of the parsing thread. When the main thread needs the parsing thread to search for a specific XML element (the target content), it stores a message in the message queue of the parsing thread indicating which content is to be searched for, and then sets a wakeup signal causing the parsing thread to wake up. At this point (while the parsing thread is searching for the target content), the main thread can either enter a sleep state or perform other work while waiting for feedback from the parsing thread. The parsing thread receives the wakeup signal, reads the message from its message queue and executes the SAX parser. The SAX parser starts parsing from where it has previous paused. When the target content is found in the XML file, the parsing thread stores a message in the message queue of the main thread, sends the main thread a feedback signal, and halts.

Figure 1:
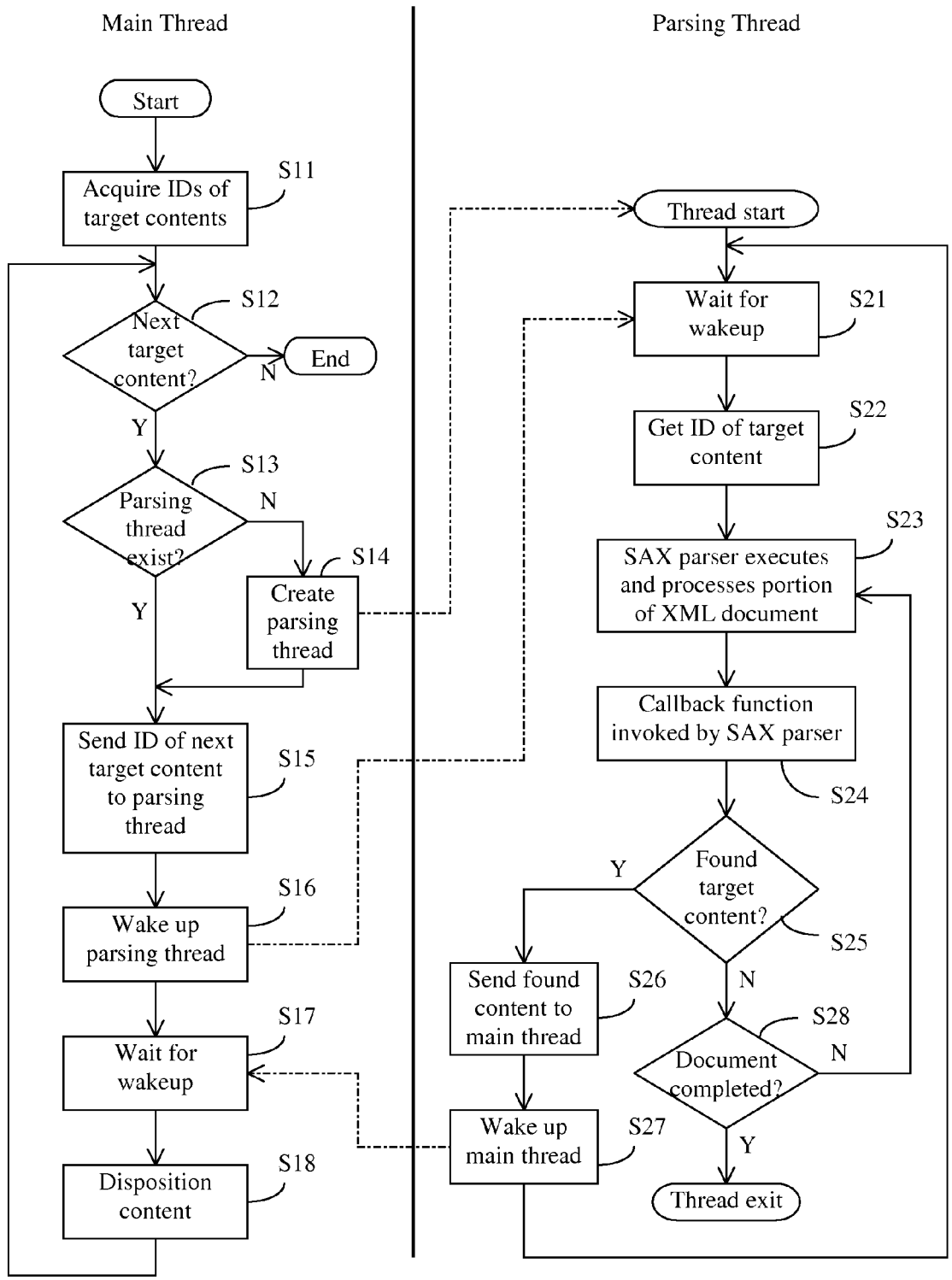
FIG. 1 is a flow diagram illustrating a SAX parsing method according to an embodiment of the present invention.

The flow chart in FIG. 1 illustrates the logic followed by the main thread and parsing thread. As explained later, the logic flows of the main thread and the parsing thread may be implemented by a CPU (Central Processing Unit) by executing a computer program stored in a storage device, such as a ROM (Read Only Memory) and an HD (Hard Disk). As shown in FIG. 1, when the main thread is started, it acquires the IDs of the target content, i.e., elements or content to search for in the XML file (step S11). The target content ID may be obtained from the user, a database, etc. Note that while the terms "element" and "content" may have specific meanings in XML, in this disclosure they are used interchangeably to generally refer to parts of an XML document, and "target content" is used to refer to that which is being searched for in the XML document. For each target content, the main thread creates a parsing thread if one does not already exist (steps S13, S14). Typically, a parsing thread, once created, continues to exist for a number of subsequent searches, but sometimes a parsing thread needs to be re-created to search the XML document from the beginning. The main thread then sends the ID of the next target content to the parsing thread (step S15) and sends a signal to wake up the parsing thread (step S16). The main thread then enters a sleep mode and waits for a wakeup signal from the parsing thread (step S17). Alternatively, the main thread can perform other tasks while waiting for the wakeup signal from the parsing thread. In this connection, note that although the signal from the parsing thread is referred to as a "wakeup signal," the main thread is not necessarily in a sleep mode.

When a parsing thread is initially created, it has not yet received any content to search for, so it enters a sleep mode and waits for a wakeup signal (step S21). When a wakeup signal is received from the main thread, the parsing thread obtains the ID of the target content (S22), which has been sent from the main thread in step S15 prior to the wakeup signal. The parsing thread then executes the SAX parser program to process a portion of the XML document (step S23). The SAX parser may be implemented by any suitable SAX parser program, including currently available programs such as XERCES. It performs parsing and invokes callback functions implemented by the parsing thread. The callback functions may be, for example, startElement( ), endElement( ), chars( ), etc. Each time the SAX parser program invokes a callback function (step S24), the parsing thread determines whether the target content has been found by the parser (step S25). If the target content is found, the parsing thread sends the content to the main thread (step S26), sends a wakeup signal to the main (step S27), and enters a sleep mode itself (i.e. further parsing operation is halted) (step S21). If, on the other hand, the target content is not found after the callback ("N" in step S25), the parsing thread will direct the SAX parser to continue parsing (step S23) until the target content is found ("Y" in step S25) or until the end of the document is reached ("Y" in step S28).

When the main thread receives the wakeup signal from the parsing thread (step S17), it performs appropriate steps to further process the content, such as converting the content to PostScript®, print, saves to disk, etc. (step S18). The main thread then repeats the process (steps S13 to S18) for the next target content until all target content is processed ("N" in step S12).

Due to the nature of the SAX parser, during a search the parsing thread cannot find content that has already been passed in the XML document. Referring back to steps S25 in the parsing thread, if after a callback is invoked the parsing thread determines that the target content has not been found ("N" in step S25), but the end of the XML document has been reached ("Y" in step S28), the parsing thread exit. Although not shown in FIG. 1 to avoid overcrowding, before it exits, the parsing thread sends a status signal to the main thread to inform the latter of this result. In response, the main thread goes to step S14 to create a new parsing thread to search for the not yet found target content from the beginning of the XML document.

An advantage of the SAX parsing method according to embodiments of the present invention is that, by using two threads of execution, parsing can be paused after a target content is found by the parsing thread, and re-started from the paused point to search for the next content when directed by the main thread. In this sense the SAX parsing may be referred to as directed SAX parsing.

Another advantage of using the two-threaded architecture is that the main thread does not have to be concerned with how the parsing thread performs its task. Therefore, as long as the interface between the two threads is kept constant, the program code for the parsing mechanism can be completely changed with out affecting the main thread.

The directed SAX parsing method may be implemented as software, firmware or hardware. It may be implemented by using any one of a number of existing XML processing software libraries to perform parsing in step S23, such as XERCES (available at the "apache.org" website).

Figure 2:
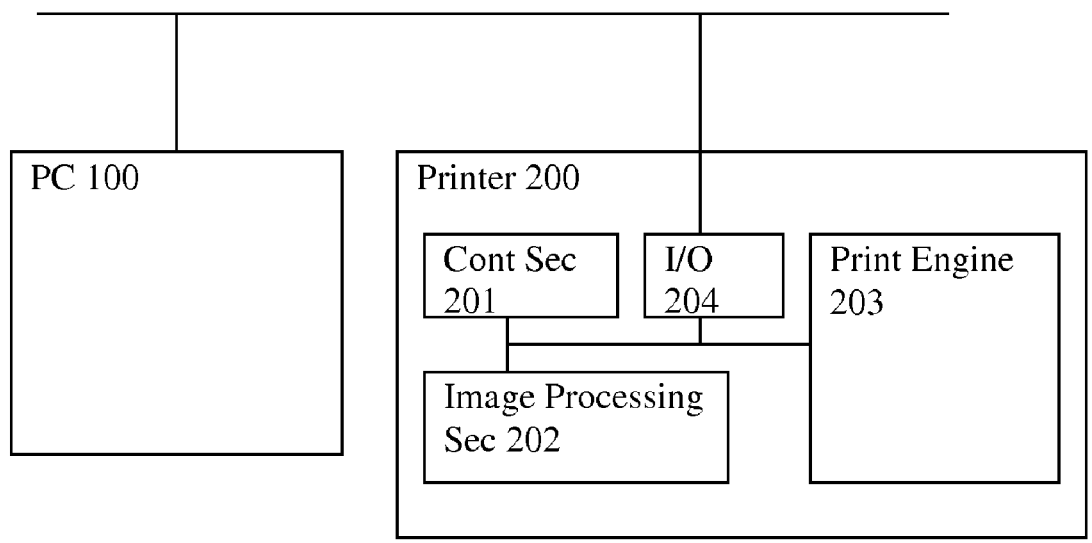
FIG. 2 is a schematic block diagram showing an exemplary printing system in which the SAX parsing method according to embodiments of the present invention may be employed.

The directed SAX parsing method forms a part of an XML processing method which may be used to process XML files for a variety of applications such as printing images by a printer, displaying images on a display device, etc. FIG. 2 is a schematic block diagram showing an exemplary printing system in which the XML parsing method may be implemented. The printing system comprises a personal computer (PC) 100 and a printer 200 connected through a data communication line, such as a serial bus, a local area network (LAN), a wide area network (WAN), and so on. The PC 100 has a structure commonly known in which a document to be printed is created using an application program, and upon a user's instruction, the document is sent to the printer 200 in a form of PDL data or a form of XML data. The printer 200 schematically comprises a control section 201, an image processing section 202, a print engine 203, and an input/output (I/O) section 204. The control section 201 comprises a central processing unit (CPU), a random access memory (RAM), and a read only memory (ROM). The CPU reads out various software programs stored in the ROM into the RAM to control the internal sections 202 through 204 of the printer 200. The CPU (and the RAM) also processes XML files using an XML processing program which is also stored in ROM, and generates raster images. The XML processing program in this embodiment comprises as a part thereof a SAX parser, which employs the two-thread architecture explained above. The image processing section 202 carries out various image processing, such as gamma correction, screening processing, etc. on rasterized image data under the control of the CPU 201, and sends the processed image data to the print engine 203. The print engine, which for instance employs the electrophotographic process, forms an image on a recording sheet based on the image data sent from the image processing section 202. The I/O section accepts print data in the form of PDL or XML data from PC 100.

It will be apparent to those skilled in the art that various modification and variations can be made in the directed SAX parsing method of the present invention without departing from the spirit or scope of the invention. In particular, although a SAX parser is used as an example, the invention is not limited to any particular XML parsing algorithm, so long as the parser operates in an event-driven, stream manner. Thus, it is intended that the present invention cover modifications and variations that come within the scope of the appended claims and their equivalents.

What is claimed is:

1. A method for processing an Extensible Markup Language (XML) document, comprising:
   in a main thread,
   (a) creating a parsing thread by the main thread, the parsing thread directly controlled by the main thread;
   (b) sending an ID of next target content to be searched for in the XML document directly to a message queue of the parsing thread, and sending a first wakeup signal to the parsing thread;
   in the parsing thread,
   (c) after receiving the first wakeup signal from the main thread, obtaining the ID of next target content sent by the main thread directly to the message queue of the parsing thread;
   (d) executing an event-driven XML parsing program to parse a portion of the XML document, the XML parsing program invoking one or more callback functions when encountering one or more pre-defined events in the XML document; and
   (e) in response to a callback function invoked by the XML parsing program, sending target content found by the XML parsing program directly to a message queue of the main thread, sending a second wakeup signal to the main thread, and then entering a sleep mode.

2. The method of claim 1, further comprising:
   in the main thread,
   (f) before step (b), acquiring IDs of target contents to be searched for in the XML document;
   (g) after step (b), waiting for the second wakeup signal from the parsing thread; and
   (h) after receiving the second wakeup signal, processing content found by the parsing thread.

3. The method of claim 2, further comprising:
   in the main thread, repeating steps (b), (g), and (h) for additional target content.

4. The method of claim 1, wherein in the parsing thread, step (e) further comprises:
   (e1) in response to each callback function invoked by the XML parsing program, determining whether the target content has been found by the XML parsing program; and
   (e2) if the target content has not been found, continuing to execute the XML parsing program.

5. The method of claim 4, further comprising:
   in the parsing thread, sending a status signal to the main thread if an end of the XML document has been reached and the target content has not been found.

6. The method of claim 5, further comprising:
   in the main thread, in response to receiving the status signal from the parsing thread, creating a new parsing thread.

7. A computer program product comprising a computer usable non-transitory medium having a computer readable code embodied therein for controlling a data processing apparatus, the computer readable program code configured to cause the data processing apparatus to execute a method for processing an Extensible Markup Language (XML) document, the process comprising the steps of:
   in a main thread,
   (a) creating a parsing thread by the main thread, the parsing thread directly controlled by the main thread;
   (b) sending an ID of next target content to be searched for in the XML document directly to a message queue of the parsing thread, and sending a first wakeup signal to the parsing thread;
   in the parsing thread,
   (c) after receiving the first wakeup signal from the main thread, obtaining the ID of next target content sent by the main thread directly to the message queue of the parsing thread;
   (d) executing an event-driven XML parsing program to parse a portion of the XML document, the XML parsing program invoking a plurality of callback functions when encountering a plurality of pre-defined events in the XML document; and
   (e) in response to a callback function invoked by the XML parsing program, sending target content found by the XML parsing program directly to a message queue of the main thread, sending a second wakeup signal to the main thread, and then entering a sleep mode.

8. The computer program product of claim 7, wherein the process further comprises:
   in the main thread,
   (f) before step (b), acquiring IDs of target contents to be searched for in the XML document;
   (g) after step (b), waiting for the second wakeup signal from the parsing thread; and
   (h) after receiving the second wakeup signal, processing content found by the parsing thread.

9. The computer program product of claim 8, wherein the process further comprises:
   in the main thread, repeating steps (b), (g), and (h) for additional target content.

10. The computer program product of claim 7, wherein in the parsing thread, step (e) further comprises:
    (e1) in response to each callback function invoked by the XML parsing program, determining whether the target content has been found by the XML parsing program; and
    (e2) if the target content has not been found, continuing to execute the XML parsing program.

11. The computer program product of claim 10, wherein the process further comprises:
    in the parsing thread, sending a status signal to the main thread if an end of the XML document has been reached and the target content has not been found.

12. The computer program product of claim 11, wherein the process further comprises:
    in the main thread, in response to receiving the status signal from the parsing thread, creating a new parsing thread.

* * * * *